US010001860B2

(12) United States Patent
Li et al.

(10) Patent No.: US 10,001,860 B2
(45) Date of Patent: Jun. 19, 2018

(54) TOUCH DISPLAY PANEL, FABRICATING METHOD THEREOF AND DRIVING METHOD THEREOF (71) Applicants: BOE TECHNOLOGY GROUP CO., LTD., Beijing (CN); ORDOS YUANSHENG OPTOELECTRONICS CO., LTD., Ordos (CN)

(72) Inventors: Xin Li, Beijing (CN); Lili Bian, Beijing (CN); Xi Chen, Beijing (CN); Kunpeng Zhang, Beijing (CN); Zhongxu Guo, Beijing (CN); Tianlei Shi, Beijing (CN); Jingyi Xu, Beijing (CN)

(73) Assignees: BOE TECHNOLOGY GROUP CO., LTD., Beijing (CN); ORDOS YUANSHENG OPTOELECTRONICS CO., LTD., Ordos (CN)

(*) Notice: Subject to any disclaimer, the term of this patent is extended or adjusted under 35 U.S.C. 154(b) by 0 days. days.

(21) Appl. No.: 15/325,011

(22) PCT Filed: Feb. 5, 2016

(86) PCT No.: PCT/CN2016/073631
§ 371 (c)(1),
(2) Date: Jan. 9, 2017

(87) PCT Pub. No.: WO2017/045348
PCT Pub. Date: Mar. 23, 2017

(65) Prior Publication Data
US 2017/0300153 A1  Oct. 19, 2017

(30) Foreign Application Priority Data
Sep. 16, 2015 (CN) .......................... 2015 1 0591963

(51) Int. Cl.
*G06F 3/041* (2006.01)
*G06F 3/044* (2006.01)
(Continued)

(52) U.S. Cl.
CPC ............ *G06F 3/0412* (2013.01); *G06F 3/044* (2013.01); *G09G 3/32* (2013.01); *G09G 3/3648* (2013.01); *G06F 2203/04103* (2013.01)

(58) Field of Classification Search
CPC . G06F 3/044; G06F 2203/04111–2203/04113; G09G 3/32; G09G 3/3648
(Continued)

(56) References Cited

U.S. PATENT DOCUMENTS 9,563,301 B2 * 2/2017 Sun .......................... G06F 3/044
2012/0105347 A1 5/2012 Pak
(Continued)

FOREIGN PATENT DOCUMENTS

CN 103294312 A 9/2013
CN 103728761 A 4/2014
(Continued)

OTHER PUBLICATIONS

International Search Report from corresponding PCT Application No. PCT/CN2016/073631, dated Jun. 13, 2016 (5 pages).
(Continued)

*Primary Examiner* — Stephen G Sherman
(74) *Attorney, Agent, or Firm* — Harness, Dickey & Pierce, P.L.C.

(57) ABSTRACT

A touch display panel, a fabricating method thereof and a driving method thereof are disclosed. The panel comprises a first touch electrode, a second touch electrode, a first touch electrode line and a second touch electrode line. The first touch electrode line and the second touch electrode line are arranged to intersect with each other to determine a touch
(Continued)

location based on a change of a capacitance between the first touch electrode and the second touch electrode. The first touch electrode is arranged on an array substrate of the touch display panel. The second touch electrode and the second touch electrode line connected thereto are arranged on an opposing substrate of the touch display panel, and the second touch electrode overlaps with a projection of the first touch electrode in a direction perpendicular to the touch display panel. The first touch electrode line is arranged on the opposing substrate and connected to the second touch electrode. Alternatively the first touch electrode line is arranged on the array substrate and connected to the first touch electrode. In this way, an aperture ratio can be increased.

19 Claims, 7 Drawing Sheets

(51) Int. Cl.
  *G09G 3/32* (2016.01)
  *G09G 3/36* (2006.01)
(58) Field of Classification Search
  USPC ........................................ 345/174; 178/18.06
  See application file for complete search history.

(56) References Cited

U.S. PATENT DOCUMENTS

| | | | |
|---|---|---|---|
| 2012/0188202 | A1 | 7/2012 | Tsujino et al. |
| 2014/0062944 | A1 | 3/2014 | Wang et al. |
| 2015/0153875 | A1* | 6/2015 | Zhang ............... G06F 3/044 345/174 |
| 2015/0268774 | A1* | 9/2015 | Xu ................... G02F 1/13338 345/173 |
| 2017/0153733 | A1 | 6/2017 | Li et al. |

FOREIGN PATENT DOCUMENTS

| | | |
|---|---|---|
| CN | 104570446 A | 4/2015 |
| CN | 104765502 A | 7/2015 |
| CN | 104808864 | 7/2015 |
| CN | 105117088 A | 12/2015 |

OTHER PUBLICATIONS

Written Opinion of the International Searching Authority from corresponding PCT Application No. PCT/CN2016/073631, dated Jun. 13, 2016 (5 pages).
Office Action from corresponding Chinese Application No. 201510591963.8 dated Jul. 26, 2017 (7 pages).

* cited by examiner

FIG.1

Prior Art

TOUCH DISPLAY PANEL, FABRICATING METHOD THEREOF AND DRIVING METHOD THEREOF

CROSS-REFERENCE TO RELATED APPLICATION

This application claims the benefit and priority of Chinese Patent Application No. 201510591963.8 filed on Sep. 16, 2015, the entire content of which is incorporated herein by reference as a part of the present application.

TECHNICAL FIELD

Exemplary embodiments of the present disclosure relate to a touch display panel, a fabricating method thereof and a driving method thereof.

BACKGROUND

With the rapid development of display technologies, emergence of a touch panel (TP) facilitates people's lives.

The touch panel includes an add on touch panel and an in cell touch panel. For the in cell touch panel, touch electrode are integrated inside a display panel and generally arranged on an array substrate of the display panel.

Figure 1:
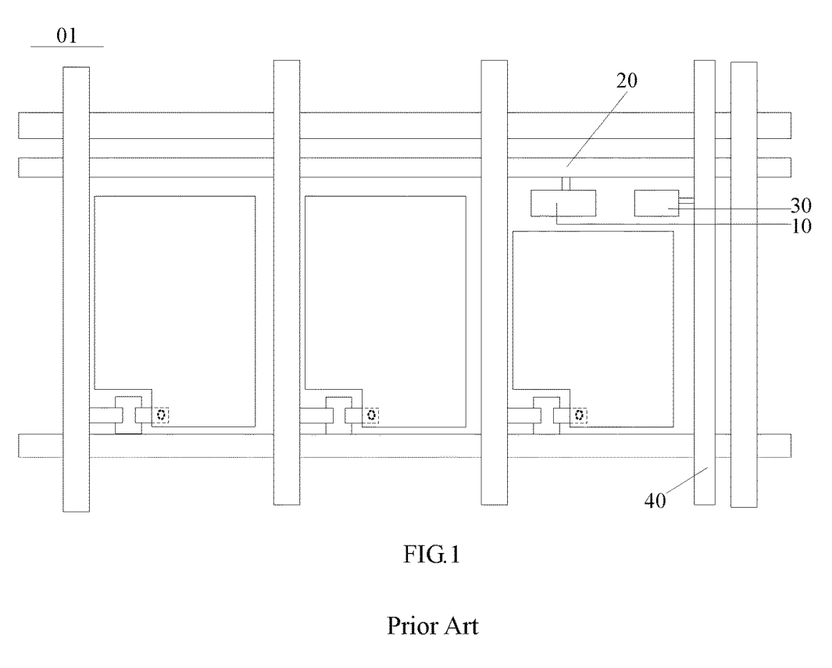
FIG. 1 is a schematic structural diagram of an array substrate in an existing in cell touch panel.

At present, for the in cell touch panel, as shown in FIG. 1, a first touch electrode 10 on the array substrate 01 is connected to a first touch electrode line 20, and a second touch electrode 30 is connected to a second touch electrode line 40. The first touch electrode 10, the second touch electrode 30, the first touch electrode line 20 and the second touch electrode line 40 are all arranged within a transparent region of a display area. The first touch electrode 10, the second touch electrode 30, the first touch electrode line 20 and the second touch electrode line 40 occupy the transparent region, which therefore reduces an aperture ratio.

SUMMARY

According to exemplary embodiments of the present disclosure, a touch display panel, a fabricating method thereof and a driving method thereof are provided, which can increase the aperture ratio.

According to a first aspect of the present disclosure, there is provided a touch display panel which includes a first touch electrode, a second touch electrode, a first touch electrode line and a second touch electrode line. The first touch electrode line and the second touch electrode line are arranged to intersect with each other to determine a touch location based on a change of a capacitance between the first touch electrode and the second touch electrode. The first touch electrode is arranged on an array substrate of the touch display panel. The second touch electrode and the second touch electrode line connected thereto are arranged on an opposing substrate of the touch display panel, and the second touch electrode overlaps with a projection of the first touch electrode in a direction perpendicular to the touch display panel. The first touch electrode line is arranged on the opposing substrate and is connected to the second touch electrode. Alternatively, the first touch electrode line is arranged on the array substrate and is connected to the first touch electrode.

According to an exemplary embodiment of the present disclosure, the opposing substrate includes an auxiliary spacer. The second touch electrode is arranged at a side of the auxiliary spacer close to the array substrate.

According to an exemplary embodiment of the present disclosure, the first touch electrode line is arranged on the array substrate, and is parallel with a data line on the array substrate. For any row of sub-pixels on the array substrate, there are two sub-pixels between two data lines adjacent to the first touch electrode line, and the first touch electrode line is between the two sub-pixels.

According to an exemplary embodiment of the present disclosure, the first touch electrode line and the data line are arranged on the same layer.

According to an exemplary embodiment of the present disclosure, the first touch electrode line is arranged on the opposing substrate. The array substrate further includes a first active layer, a first source electrode, a first drain electrode and a signal line connected to the first source electrode, which are arranged at a side of a gate line close to the opposing substrate. The first drain electrode is the first touch electrode.

According to an exemplary embodiment of the present disclosure, the array substrate further includes a thin-film transistor arranged in a sub-pixel region, which includes a gate electrode, a second active layer, a second source electrode and a second drain electrode, and a data line connected to the second source electrode and arranged on the same layer as the second source electrode. The first active layer and the second active layer are arranged on the same layer. The signal line is parallel with the data line, and the first source electrode, the first drain electrode and the signal line are arranged on the same layer as the second source electrode, the second drain electrode and the data line.

According to an exemplary embodiment of the present disclosure, the signal line is parallel with the data line on the array substrate. For any row of sub-pixels on the array substrate, there are two sub-pixels between two data lines adjacent to the signal line, and the signal line is between the two sub-pixels.

According to an exemplary embodiment of the present disclosure, the second touch electrode and the second touch electrode line are arranged on the same layer, and an organic insulating layer is arranged between the second touch electrode and the first touch electrode line.

According to a second aspect of the present disclosure, there is provided a fabricating method for the touch display panel. The fabricating method for the touch display panel comprises fabricating the array substrate which includes: forming a gate line and a gate electrode in a patterning process, and forming a gate insulation layer; forming a first active layer above the gate line and a second active layer above the gate electrode in a patterning process; and forming a first source electrode and a first drain electrode above the first active layer, forming a second source electrode and a second drain electrode above the second active layer, forming a signal line connected to the first source electrode, and forming a data line connected to the second source electrode in a patterning process.

According to an exemplary embodiment of the present disclosure, the fabricating method for the touch display panel comprises fabricating the opposing substrate which includes: forming a second touch electrode and a second touch electrode line in a patterning process, and forming an organic insulating layer; and forming a first touch electrode line in a patterning process.

According to an exemplary embodiment of the present disclosure, fabricating the opposing substrate further includes forming an auxiliary spacer. The second touch electrode is formed at the side of the auxiliary spacer close to the array substrate.

According to a third aspect of the present disclosure, there is provided a driving method for the touch display panel, which includes inputting a scanning signal into gate lines on the array substrate in sequence, and inputting a driving signal into a signal line.

In the touch display panel, the fabricating method thereof and the driving method thereof according to the exemplary embodiments of the present disclosure, the second touch electrode line or both the second touch electrode line and the first touch electrode line are arranged on the opposing substrate. That is, at most the first touch electrode and the first touch electrode line are arranged on the array substrate. Therefore, compared with the existing solution in which the first touch electrode, the second touch electrode, the first touch electrode line and the second touch electrode line are all arranged on the array substrate, the aperture ratio can be improved.

BRIEF DESCRIPTION OF DRAWINGS

To describe the technical solutions of the embodiments of the present disclosure or that of the prior art more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

Technical solutions in the embodiments of the present disclosure will be described clearly and completely below, in conjunction with the accompanying drawings in the embodiments of the present disclosure. Apparently, the described embodiments are some but not all of the embodiments of the present disclosure. All other embodiments obtained by those of ordinary skills in the art based on the embodiments of the present disclosure without creative efforts shall fall within the protection scope of the present disclosure.

Unless otherwise defined, all technical or scientific terms used herein have the same meaning as commonly understood by those skilled in the art. The terms "first", "second" and the like used in the description and claims of the present disclosure do not denote any sequence, quantity or importance, but instead are merely used to distinguish different components. The terms "connect" or "connection" and the like are not limited to physical or mechanical connection, but also may include electrical connection, either directly or indirectly. The orientations or positions represented by the terms "above", "below" and the like are based on the orientations or positions as shown in the accompanying figures, which are merely for description of the present disclosure. Unless otherwise explicitly stated, the term "a plurality of" means two or more than two.

According to the embodiments of the present disclosure, there is provided a touch display panel. The touch display panel may comprise a first touch electrode, a second touch electrode, a first touch electrode line and a second touch electrode line. The first touch electrode line and the second touch electrode line are arranged to intersect with each other to determine a touch location based on a change of a capacitance between the first touch electrode and the second touch electrode.

As shown in FIG. 2, FIG. 4, FIG. 6a and FIG. 6b, the first touch electrode 10 may be arranged on the array substrate 01 of the touch display panel. As shown in FIG. 3, FIG. 5 and FIG. 7, the second touch electrode 30 and the second touch electrode line 40 connected thereto may be arranged on the opposing substrate 02 of the touch display panel. The second touch electrode 30 may overlap with the projection of the first touch electrode 10 in a direction perpendicular to the touch display panel. The first touch electrode line 20 may be arranged on the array substrate 01 or on the opposing substrate 02.

It should be noted that, firstly, according to the embodiments of the present disclosure, the principle of identifying the touch location is as follows. When there is no touch on the touch display panel, the capacitance between the first touch electrode 10 and the second touch electrode 30 is constant. But when there is a touch on the touch display panel, the capacitance between the first touch electrode 10 and the second touch electrode 30 may be changed, compared with the capacitance when there is no touch. Thus, the touch location may be determined according to the first touch electrode line 20 and the second touch electrode line 40 corresponding to the first touch electrode 10 and the second touch electrode 30 respectively.

In the case of determining the touch location according to the first touch electrode line 20 and the second touch electrode line 40, there are two ways for arranging the first touch electrode line 20.

Figure 2:
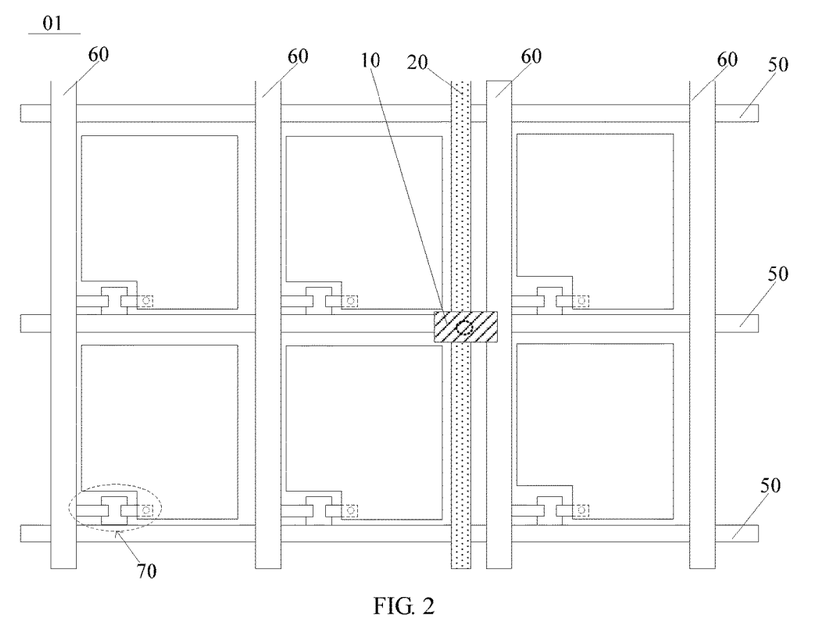
FIG. 2 is a schematic structural diagram of the array substrate in the touch display panel according to an embodiment of the present disclosure.
Figure 3:
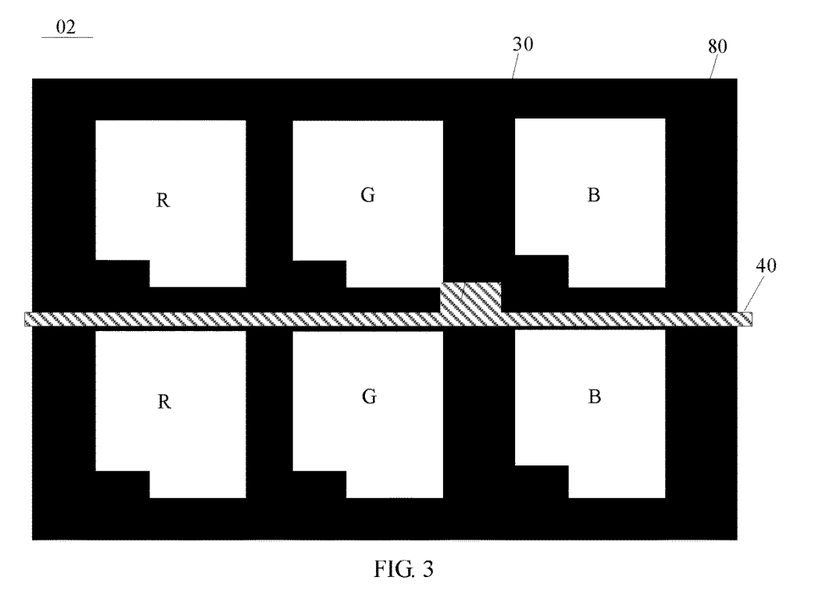
FIG. 3 is a schematic structural diagram of the opposing substrate in the touch display panel as shown in FIG. 2.
Figure 4:
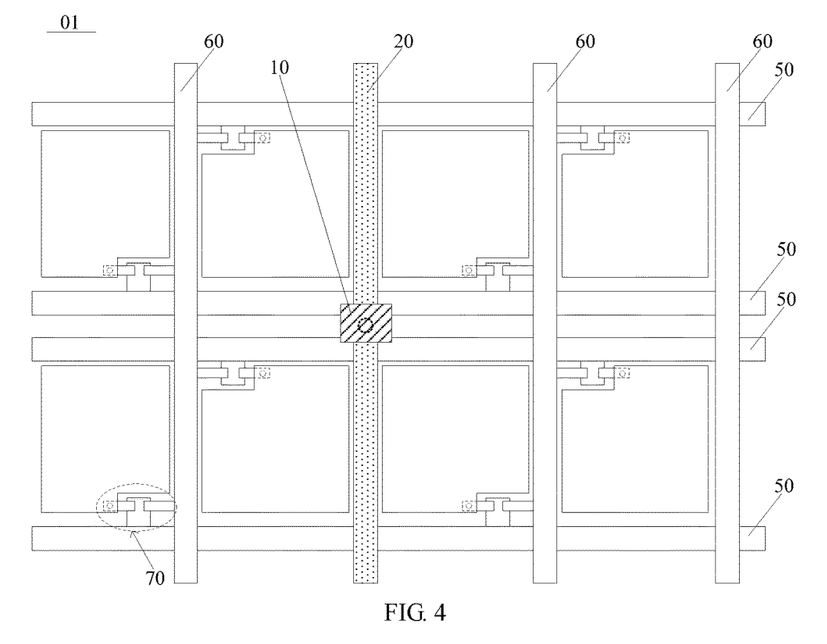
FIG. 4 is a schematic structural diagram of the array substrate in the touch display panel according to another embodiment of the present disclosure.
Figure 5:
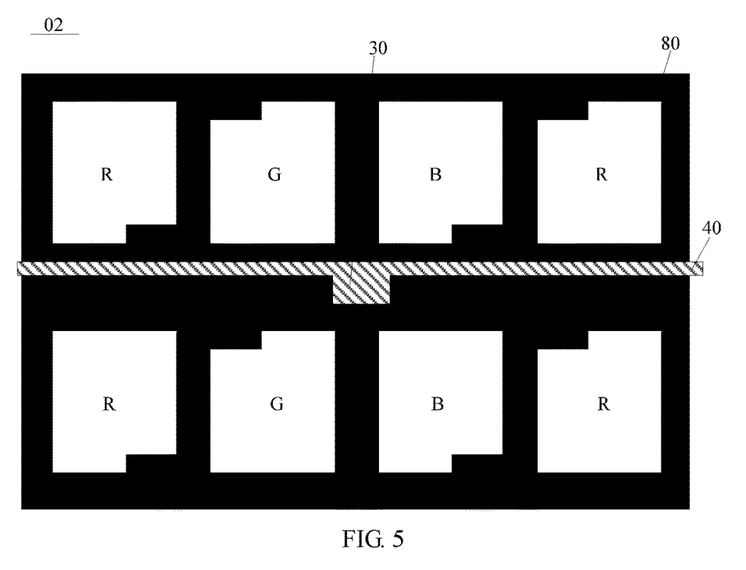
FIG. 5 is a schematic structural diagram of the opposing substrate in the touch display panel as shown in FIG. 4.

The first way is that, as shown in FIG. 2 and FIG. 4, the first touch electrode line 20 is arranged on the array substrate 01.

In this case, the first touch electrode line 20 needs to be connected to the first touch electrode 10 in order to identify the touch location according to the first touch electrode line 20 and the second touch electrode line 40. In this way, when the capacitance between the first touch electrode 10 on the array substrate 01 and the second touch electrode 30 on the opposing substrate 02 is changed, the touch location may be determined according to the first touch electrode line 20 and the second touch electrode line 40 connected to the first touch electrode 10 and the second touch electrode 30 respectively.

The second ways is that, as shown in FIG. 7, the first touch electrode line 20 is arranged on the opposing substrate 02.

In this case, the first touch electrode line 20 needs to be connected to the second touch electrode 30 in order to identify the touch location according to the first touch electrode line 20 and the second touch electrode line 40. In this way, when the capacitance between the first touch electrode 10 on the array substrate 01 and the second touch electrode 30 on the opposing substrate 02 is changed, the touch location can be determined according to the first touch electrode line 20 and the second touch electrode line 40 both of which are connected to the second touch electrode 30.

Secondly, according to some exemplary embodiments of the present disclosure, the touch display panel may be a liquid crystal display panel or an organic electroluminescent display panel, which is not limited specifically herein.

No matter the touch display panel is the liquid crystal display panel or the organic electroluminescent display panel, the array substrate 01 as shown in FIG. 2, FIG. 4, FIG. 6a and FIG. 6b, may include a plurality of sub-pixels arranged in an array. Each of the sub-pixels may include a thin-film transistor 70.

For the liquid crystal display panel, the sub-pixel on the array substrate 01 further includes a pixel electrode connected to the drain electrode of the thin-film transistor 70. Further the sub-pixel may include a common electrode. The pixel electrode and the common electrode may be arranged at intervals on the same layer and both of them are strip-shaped electrodes. Alternatively, the pixel electrode and the common electrode may be arranged on different layers. The electrode at the upper layer is the strip-shaped electrode, and the electrode at the lower layer is the plate-shaped electrode. For the organic electroluminescent display panel, the sub-pixel on the array substrate 01 may further include an anode connected to the drain electrode of the thin-film transistor 70, and an organic light emitting layer and a cathode positioned above the anode.

Of course, the array substrate 01 further includes a gate line 50 connected to the gate electrode of the thin-film transistor 70 and a data line 60 connected to the source electrode of the thin-film transistor 70.

For the liquid crystal display panel, the opposing substrate 02, as shown in FIG. 3, FIG. 5 and FIG. 7, may include a color film layer R, a color film layer G, a color film layer B and a black matrix 80. For the organic electroluminescent display panel, the opposing substrate 02 is a package substrate.

Thirdly, there is no limit to the locations of the first touch electrode 10, the second touch electrode 30, the first touch electrode line 20 and the second touch electrode line 40 on the respective substrates, as long as the touch location can be identified.

Fourthly, since capacitive touch is adopted in some embodiments of the present disclosure, both the first touch electrode 10 and the second touch electrode 30 are made of transparent conductive materials such as indium tin oxide (ITO), indium zinc oxide (IZO) and the like. In this case, since the second touch electrode line 40 is connected to the second touch electrode 30, in order to simplify the process, those skilled in the art usually choose the transparent conductive materials for the second touch electrode line 40 such that the second touch electrode line 40 and the second touch electrode 30 can be formed in the same patterning process.

In this case, the first touch electrode line 20 may also be arranged on the opposing substrate 02, and the first touch electrode line 20 may be made of the transparent conductive materials, according to some embodiments of the present disclosure.

In the case that the first touch electrode line 20 is arranged on the array substrate 01, the materials of the first touch electrode line 20 may be, but not limited to, the transparent conductive materials or metal materials, as needed.

According to some embodiments of the present disclosure, there is provided a touch display panel. The second touch electrode line 40 may be arranged on the opposing substrate 02. Alternatively both the second touch electrode line 40 and the first touch electrode line 20 are arranged on the opposing substrate 02. That is, at most the first touch electrode 10 and the first touch electrode line 20 are arranged on the array substrate 01. Therefore, compared with the existing solution in which the first touch electrode 10, the second touch electrode 30, the first touch electrode line 20 and the second touch electrode line 40 are all arranged on the array substrate, the aperture ratio can be increased.

Figure 8:
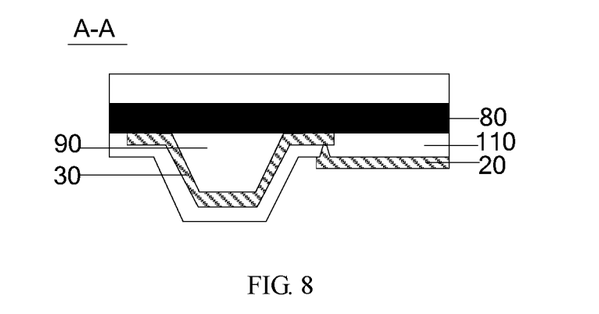
FIG. 8 is a section view along A-A direction in FIG. 7.

According to some embodiments of the present disclosure, as shown in FIG. 8, the opposing substrate 02 may include an auxiliary spacer 90. The second touch electrode 30 may be arranged at a side of the auxiliary spacer 90 close to the array substrate 01.

It should be noted that, firstly, those skilled in the art will appreciate that a spacer supporting a cell gap generally may be categorized into main spacer and auxiliary spacer. The main spacer in some embodiments of the present disclosure may be arranged as usual, which will not be limited herein.

Secondly, FIG. 8 is the section view along an A-A direction in FIG. 7. However, the embodiments of the present disclosure are not limited thereto. The second touch electrode 30 arranged at the side of the auxiliary spacer 90 close to the array substrate 01 is applicable to other cases.

In some embodiments of the present disclosure, the auxiliary spacer 90 is close to the array substrate 01, therefore the first touch electrode 10 is close to the second touch electrode 30, and the capacitance between the two touch electrodes is relatively large. When there is the touch on the touch display panel, the change of the capacitance between the two touch electrodes is more sensitive, and thus the touch location identified is more precise.

In addition, since the auxiliary spacer 90 is arranged within the non-sub-pixel region, when the second touch electrode 30 is arranged at the side of the auxiliary spacer 90 close to the array substrate 01, the first touch electrode 10 arranged on the array substrate 01 corresponding to the second touch electrode 30 is arranged within the non-sub-pixel region accordingly. In this way, the effect on the aperture ratio by the first touch electrode 10 may be avoided, and the aperture ratio may be further increased. In the touch display panel, only the sub-pixel region is light-transmissible. Therefore, in some embodiments of the present disclosure, the non-sub-pixel region refers to a region other than the sub-pixel region, for example, the region between any adjacent sub-pixels.

In the case that the first touch electrode line 20 is arranged on the array substrate 01 and connected to the first touch electrode 10, as shown in FIG. 4, the first touch electrode line 20 may be arranged in parallel with the data line 60 on the array substrate 01. For any row of sub-pixels on the array substrate 01, two sub-pixels are arranged between two data lines 60 adjacent to the first touch electrode line 20, and the first touch electrode line 20 is arranged between the two sub-pixels.

By properly arranging the sub-pixels and the data lines 60, the first touch electrode lines 20 may be arranged within the non-sub-pixel region. Thus, when the first touch electrode line 20 is arranged on the array substrate 01, the effect on the aperture ratio by the first touch electrode lines 20 may be avoided, and thus the aperture ratio may be further increased.

According to some exemplary embodiments of the present disclosure, the first touch electrode line 20 and the data line 60 may be arranged on the same layer. In this way, the number of the patterning processes may be reduced.

In this case, the material of the first touch electrode 10 is the transparent conductive material, and the material of the first touch electrode line 20 is the metal material. Therefore, the first touch electrode 10 and the first touch electrode line 20 may be electrically connected through a via hole.

Figure 6A:
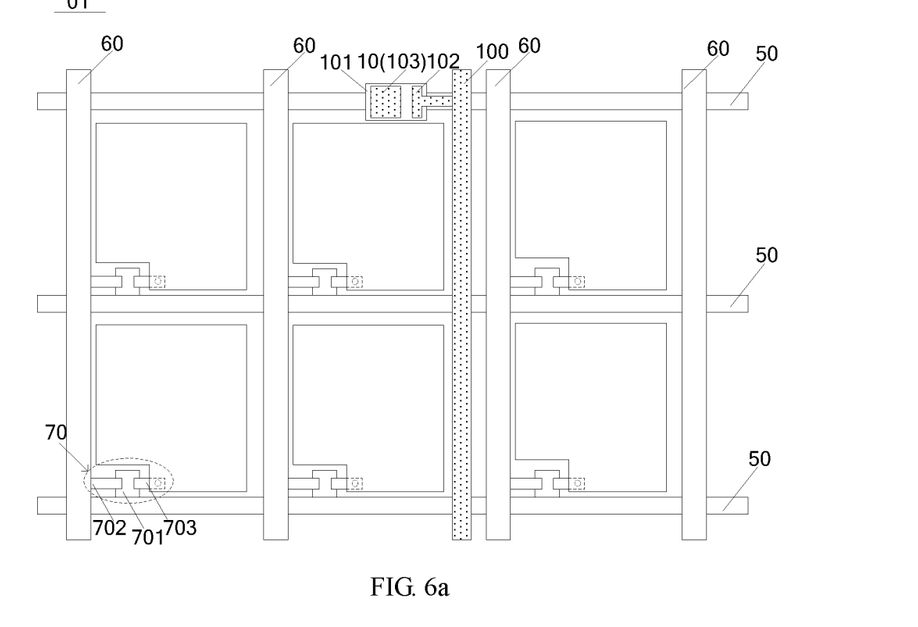
FIG. 6a is a schematic structural diagram of the array substrate in the touch display panel according to yet another embodiment of the present disclosure.
Figure 6B:
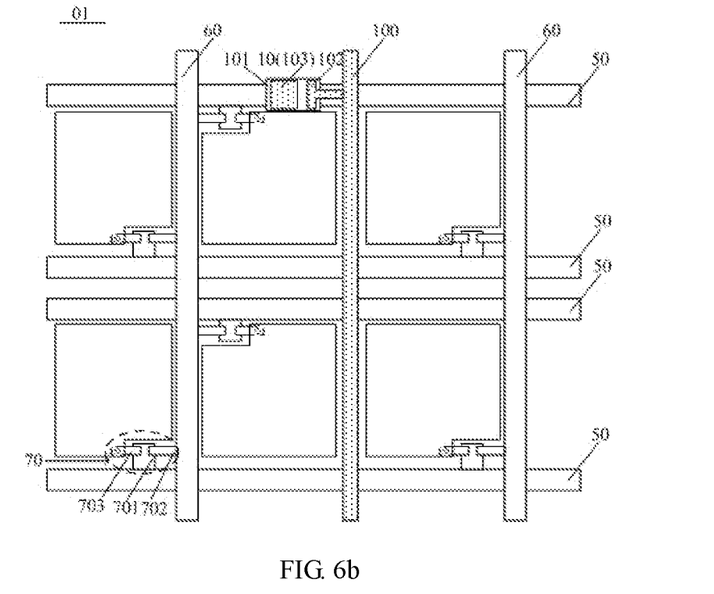
FIG. 6b is a schematic structural diagram of the array substrate in the touch display panel according to still another embodiment of the present disclosure.
Figure 7:
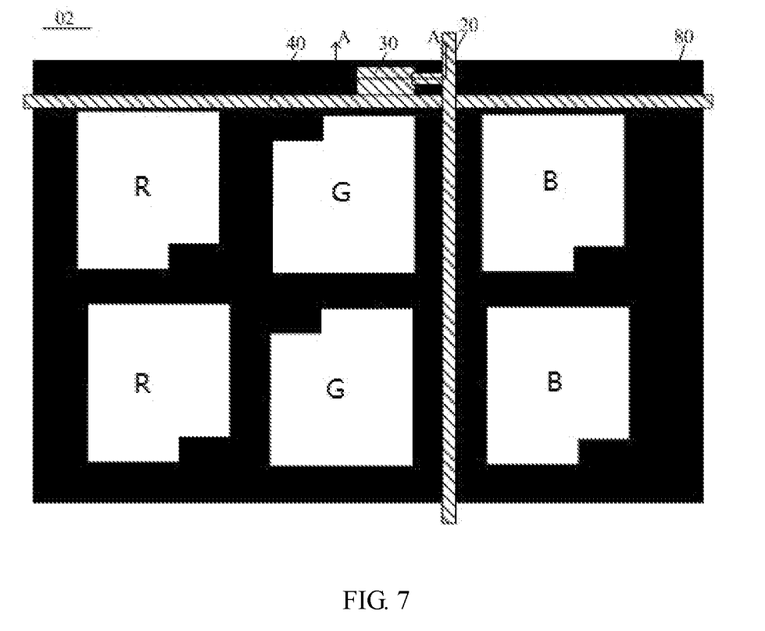
FIG. 7 is a schematic structural diagram of the opposing substrate in the touch display panel as shown in FIG. 6b.

As shown in FIG. 7, when the first touch electrode line 20 is arranged on the opposing substrate 02 and is connected to the second touch electrode 30, as shown in FIG. 6a and FIG. 6b, the array substrate 01 further includes a first active layer 101, a first source electrode 102, a first drain electrode 103 and a signal line 100 connected to the first source electrode which are arranged at the side of the gate line 50 close to the opposing substrate 02. The first drain electrode 103 is the first touch electrode 10.

The gate line 50, the first active layer 101, the first source electrode 102 and the first drain electrode 103 (i.e., the first touch electrode 10) may constitute the thin-film transistor. Thus, the voltage supplied to the first drain electrode 103 via the signal line 100 (i.e., the first touch electrode 10) may be maintained, thereby facilitating the identifying of the touch location.

On the other hand, the first touch electrode line 20 and the second touch electrode line 40 may be arranged on the opposing substrate 02, which may avoid the effect on the aperture ratio. In addition, the wirings on the opposing substrate 02 are relatively few, and for any second touch electrode 30, the first touch electrode line 20 and the second touch electrode line 40 are electrically connected. Therefore, the imprecise identification of the touch location due to crosstalk between the first touch electrode line 20 and the second touch electrode line 40 may be improved.

According to some exemplary embodiments of the present disclosure, the thin-film transistor 70 arranged within the sub-pixel region of the array substrate 01 may include a gate electrode 701, a second active layer, a second source electrode 702 and a second drain electrode 703, and the second source electrode 702 may be connected to the data lines 60 and arranged on the same layer as the data line 60. Therefore, according to the embodiments of the present disclosure, the first active layer 101 and the second active layer may be arranged on the same layer, the signal line 100 may be arranged in parallel with the data line 60, and the first source electrode 102, the first drain electrode 103 (i.e., the first touch electrode 10) and the signal line 100 may be arranged on the same layer as the second source electrode 702, the second drain electrode 703 and the data line 60. In this way, the number of the patterning processes may be reduced.

According to some exemplary embodiments of the present disclosure, as shown in FIG. 6b, for any row of sub-pixels on the array substrate 01, two sub-pixels may be arranged between two data lines 60 adjacent to the signal line 100, and the signal line 100 may be arranged between the two sub-pixels. In this way, the effect on the aperture ratio by the signal line 100 may be avoided.

According to some exemplary embodiments of the present disclosure, as shown in FIG. 8, the second touch electrode 30 and the second touch electrode line 40 may be arranged on the same layer. The organic insulating layer 110 may be arranged between the second touch electrode 30 and the first touch electrode line 20.

Since the organic insulating layer 110 may be relatively thick, the imprecise identification of the touch location due to interference between the first touch electrode line 20 and the second touch electrode line 40 not electrically connected thereto may be avoided.

According to some embodiments of the present disclosure, there is provided a fabricating method for the touch display panel including the array substrate 01 and the opposing substrate 02.

As shown in FIG. 6a and FIG. 6b, the array substrate 01 includes the thin-film transistor 70 arranged within the sub-pixel region. The thin-film transistor 70 includes the gate electrode 701, the second active layer, the second source electrode 702 and the second drain electrode 703. The gate electrode 701 is connected to the gate line 50, and the second source electrode 702 is connected to the data line 60. The array substrate may further include the first active layer 101, the first source electrode 102, the first drain electrode 103 and the signal line 100 connected to the first source electrode 102 which are arranged at the side of the gate line 50 close to the opposing substrate 02. The first drain electrode 103 is the first touch electrode 10.

As shown in FIG. 7, the opposing substrate 02 includes the color film layer R, the color film layer G, the color film layer B and the black matrix 80. The opposing substrate 02 further includes the second touch electrode 30, the second touch electrode line 40 and the first touch electrode line 20. Both the second touch electrode line 40 and the first touch electrode line 20 are electrically connected to the second touch electrode 30. The first touch electrode 10 overlaps with the projection of the second touch electrode 30 in the direction perpendicular to the touch display panel.

Figure 9A:
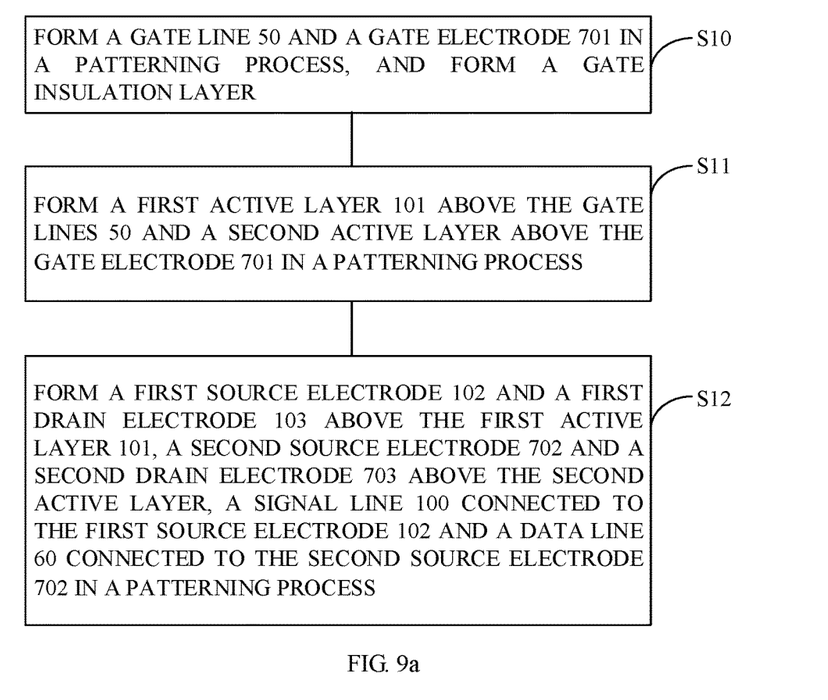
FIG. 9a is a schematic flow chart of a process for fabricating the array substrate according to an embodiment of the present disclosure.

FIG. 9a shows the fabricating method for the touch display panel 01. As shown in FIG. 9a, at S10, the gate line 50 and the gate electrode 701 are formed in a patterning process, and the gate insulation layer is formed. At S11, the first active layer 101 is formed above the gate line 50 and the second active layer is formed above the gate electrode 701 in a patterning process. At S12, in a patterning process, the first source electrode 102 and the first drain electrode 103 are formed above the first active layer 101, the second source electrode 702 and the second drain electrode 703 are formed above the second active layer, the signal line 100 connected to the first source electrode 102 and the data line 60 connected to the second source electrode 702 are formed.

Figure 9B:
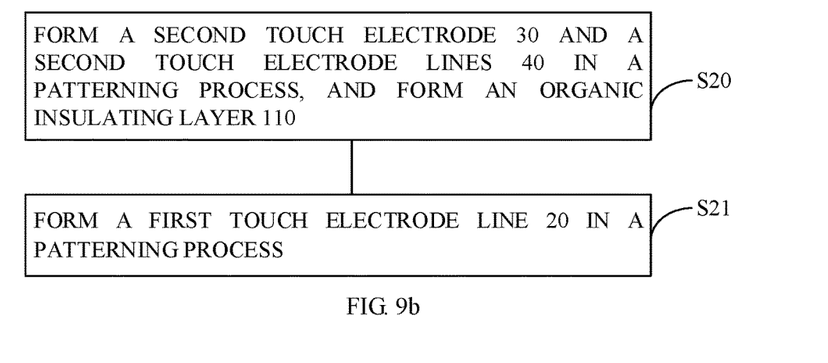
FIG. 9b is a schematic flow chart of a process for fabricating the opposing substrate according to an embodiment of the present disclosure.

FIG. 9b shows the fabricating method for the opposing substrate 02. As shown in FIG. 9b, at S20, the second touch electrode 30 and the second touch electrode lines 40 are formed in a patterning process, and the organic insulating layer 110 is formed. At S21, the first touch electrode line 20 is formed in a patterning process.

According to some exemplary embodiments of the present disclosure, the fabricating method for the opposing substrate 02 further includes forming an auxiliary spacer 90. The second touch electrode 30 may be formed at the side of the auxiliary spacer 90 close to the array substrate 01.

According to an embodiment of the present disclosure, there is provided a driving method for the touch display panel including an array substrate 01 and an opposing substrate 02.

As shown in FIG. 6*a* and FIG. 6*b*, the array substrate 01 includes the thin-film transistor 70 arranged within the sub-pixel region. The thin-film transistor 70 includes the gate electrode 701, the second active layer, the second source electrode 702 and the second drain electrode 703. The gate electrode 701 is connected to the gate line 50, and the second source electrode 702 is connected to the data line 60. The array substrate may further include the first active layer 101, the first source electrode 102, the first drain electrode 103 and the signal line 100 connected to the first source electrode 102 which are arranged at the side of the gate line 50 close to the opposing substrate 02. The first drain electrode 103 is the first touch electrode 10.

As shown in FIG. 7, the opposing substrate 02 includes the color film layer R, the color film layer G, the color film layer B and the black matrix 80. The opposing substrate 02 may further include the second touch electrode 30, the second touch electrode line 40 and the first touch electrode line 20. Both the second touch electrode line 40 and the first touch electrode line 20 are electrically connected to the second touch electrode 30. The first touch electrode 10 overlaps with the projection of the second touch electrode 30 in the direction perpendicular to the touch display panel.

Figure 10:
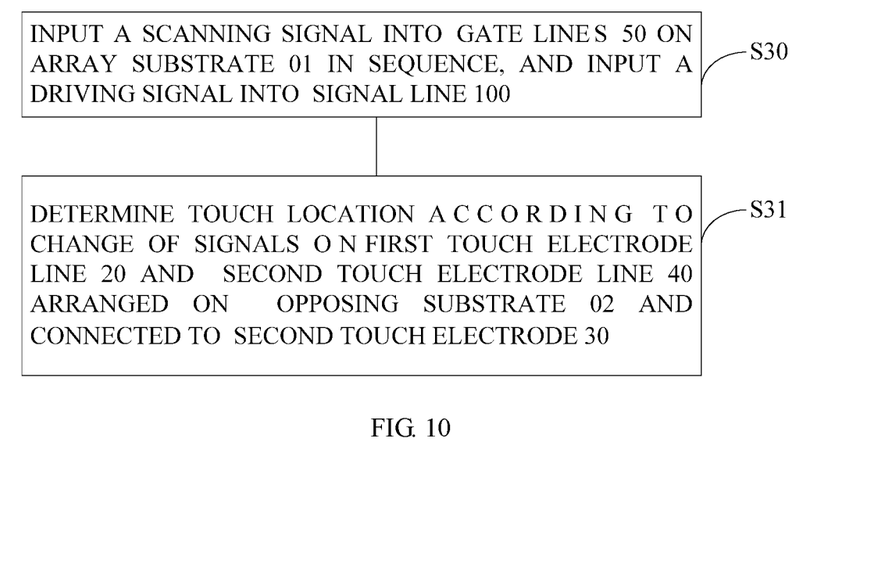
FIG. 10 is a schematic flow chart of the driving method for the touch display panel according to an embodiment of the present disclosure.

FIG. 10 shows the driving method for the touch display panel. As shown in FIG. 10, at S30, a scanning signal is inputted into the gate lines 50 on the array substrate 01 in sequence, and a driving signal is inputted into the signal line 100. At S31, the touch location is determined according to the change of the signals on the first touch electrode line 20 and the second touch electrode line 40 arranged on the opposing substrate 02 and connected to the second touch electrode 30.

That is, when there is the touch, the capacitance between the second touch electrode 30 and the first touch electrode 10 will be changed, so that the signals on the first touch electrode line 20 and the second touch electrode line 40 are changed, and thus the touch location may be determined.

The abovementioned embodiments are merely the embodiments of the present disclosure, but the protection scope of the present disclosure is not limited thereto. Any variation or substitution easily conceivable to a person of ordinary skills in the art within the technical scope disclosed in the present disclosure shall fall into the protection scope of the present disclosure. Therefore, the protection scope of the present disclosure shall be subject to the protection scope of the claims.

What is claimed is:

1. A touch display panel, comprising:
a first touch electrode;
a second touch electrode;
a first touch electrode line; and
a second touch electrode line,
wherein the first touch electrode is arranged on an array substrate of the touch display panel,
wherein the second touch electrode is arranged on an opposing substrate of the touch display panel and is connected to the second touch electrode line, the second touch electrode line is arranged on the opposing substrate, and the second touch electrode is arranged to overlap with a projection of the first touch electrode in a direction perpendicular to the touch display panel,
wherein the first touch electrode line is arranged on the opposing substrate and is connected to the second touch electrode or the first touch electrode line is arranged on the array substrate and is connected to the first touch electrode, and
wherein the first touch electrode line and the second touch electrode line are isolated from one another, and projections of the first touch electrode line and the second electrode line in a direction perpendicular to the touch display panel intersect one another.

2. The touch display panel according to claim 1, wherein the opposing substrate comprises an auxiliary spacer, and
wherein the second touch electrode is arranged at a side of the auxiliary spacer close to the array substrate.

3. The touch display panel according to claim 2, wherein the first touch electrode line is arranged on the array substrate, and is parallel with a data line on the array substrate, and
wherein for any row of sub-pixels on the array substrate, there are two sub-pixels between two data lines adjacent to the first touch electrode line, and the first touch electrode line is between the two sub-pixels.

4. The touch display panel according to claim 3, wherein the first touch electrode line and the data line are arranged on the same layer.

5. The touch display panel according to claim 2, wherein the first touch electrode is a first drain electrode,
wherein the first touch electrode line is arranged on the opposing substrate, and
wherein the array substrate comprises the first drain electrode and further comprises a first active layer, a first source electrode, and a signal line connected to the first source electrode which are arranged at a side of a gate line close to the opposing substrate.

6. The touch display panel according to claim 5, wherein the array substrate further comprises a thin-film transistor arranged in a sub-pixel region, which comprises a gate electrode, a second active layer, a second source electrode and a second drain electrode, and a data line connected to the second source electrode and arranged on the same layer as the second source electrode,
wherein the first active layer and the second active layer are arranged on the same layer, and
wherein the signal line is parallel with the data line, and the first source electrode, the first drain electrode and the signal line are arranged on the same layer as the second source electrode, the second drain electrode and the data line.

7. The touch display panel according to claim 5, wherein the signal line is parallel with the data line on the array substrate, and
wherein for any row of sub-pixels on the array substrate, there are two sub-pixels between two data lines adjacent to the signal line, and the signal line is between the two sub-pixels.

8. The touch display panel according to claim 6, wherein the signal line is parallel with the data line on the array substrate, and
wherein for any row of sub-pixels on the array substrate, there are two sub-pixels between two data lines adjacent to the signal line, and the signal line is between the two sub-pixels.

9. The touch display panel according to claim 1, wherein the first touch electrode line is arranged on the array substrate, and is parallel with a data line on the array substrate, and
wherein for any row of sub-pixels on the array substrate, there are two sub-pixels between two data lines adjacent to the first touch electrode line, and the first touch electrode line is between the two sub-pixels.

10. The touch display panel according to claim 9, wherein the first touch electrode line and the data line are arranged on the same layer.

11. The touch display panel according to claim 1, wherein the first touch electrode is a first drain electrode,
wherein the first touch electrode line is arranged on the opposing substrate, and
wherein the array substrate comprises the first drain electrode and further comprises a first active layer, a first source electrode, and a signal line connected to the first source electrode which are arranged at a side of a gate line close to the opposing substrate.

12. The touch display panel according to claim 11, wherein the array substrate further comprises a thin-film transistor arranged in a sub-pixel region, which comprises a gate electrode, a second active layer, a second source electrode and a second drain electrode, and a data line connected to the second source electrode and arranged on the same layer as the second source electrode,
wherein the first active layer and the second active layer are arranged on the same layer, and
wherein the signal line is parallel with the data line, and the first source electrode, the first drain electrode and the signal line are arranged on the same layer as the second source electrode, the second drain electrode and the data line.

13. A fabricating method for the touch display panel according to claim 12, the method comprising fabricating the array substrate by:
forming the gate line and the gate electrode in a patterning process, and forming a gate insulation layer;
forming the first active layer above the gate line and the second active layer above the gate electrode in a patterning process; and
forming the first source electrode and the first drain electrode above the first active layer, forming the second source electrode and the second drain electrode above the second active layer, forming the signal line connected to the first source electrode and forming the data line connected to the second source electrode in a patterning process.

14. The fabricating method according to claim 13, further comprising fabricating the opposing substrate by:
forming the second touch electrode and the second touch electrode line in a patterning process, and forming an organic insulating layer; and
forming the first touch electrode line in a patterning process.

15. The fabricating method according to claim 14, wherein fabricating the opposing substrate further comprises forming an auxiliary spacer;
and wherein the second touch electrode is formed at a side of the auxiliary spacer close to the array substrate.

16. The touch display panel according to claim 12, wherein the signal line is parallel with the data line on the array substrate, and
wherein for any row of sub-pixels on the array substrate, there are two sub-pixels between two data lines adjacent to the signal line, and the signal line is between the two sub-pixels.

17. The touch display panel according to claim 11, wherein the signal line is parallel with the data line on the array substrate, and wherein for any row of sub-pixels on the array substrate, there are two sub-pixels between two data lines adjacent to the signal line, and the signal line is between the two sub-pixels.

18. A driving method for the touch display panel according to claim 11, the method comprising:
inputting a scanning signal into gate lines on the array substrate in sequence, and inputting a driving signal into the signal line.

19. The touch display panel according to claim 1, wherein the second touch electrode and the second touch electrode line are arranged on the same layer, and wherein an organic insulating layer is arranged between the second touch electrode and the first touch electrode line.

* * * * *